US008559612B2

(12) United States Patent
Ramanathan et al.

(10) Patent No.: US 8,559,612 B2
(45) Date of Patent: Oct. 15, 2013

(54) MULTIMODAL CONVERSATION PARK AND RETRIEVAL

(75) Inventors: Rajesh Ramanathan, Redmond, WA (US); Brian Stucker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1051 days.

(21) Appl. No.: 12/465,421

(22) Filed: May 13, 2009

(65) Prior Publication Data

US 2010/0290611 A1    Nov. 18, 2010

(51) Int. Cl.
H04M 3/42 (2006.01)

(52) U.S. Cl.
USPC .................. 379/212.01; 379/201.01

(58) Field of Classification Search
USPC ....................... 379/212.01, 201.01
See application file for complete search history.

(56) References Cited

U.S. PATENT DOCUMENTS

| | | | |
|---|---|---|---|
| 6,275,701 B1 * | 8/2001 | Cerwall | 455/436 |
| 6,650,748 B1 * | 11/2003 | Edwards et al. | 379/266.04 |
| 8,121,282 B1 * | 2/2012 | Zhuang et al. | 379/351 |
| 2004/0006475 A1 | 1/2004 | Ehlen et al. | |
| 2006/0217133 A1 | 9/2006 | Christenson et al. | |
| 2007/0033249 A1 | 2/2007 | Samdadiya et al. | |
| 2007/0153770 A1 | 7/2007 | Goyal et al. | |
| 2007/0165554 A1 | 7/2007 | Jefferson et al. | |
| 2007/0297581 A1 | 12/2007 | Kuo et al. | |
| 2008/0096553 A1 | 4/2008 | Saksena et al. | |
| 2008/0130848 A1 | 6/2008 | Elumalai et al. | |
| 2008/0282261 A1 | 11/2008 | Bou-Ghannam et al. | |

OTHER PUBLICATIONS

"International Search Report", Mailed Date: Dec. 28, 2010, Application No. PCT/US2010/034280, Filed Date: May 10, 2010, pp. 8.
"Avaya One-X Desktop Edition", Retrieved at <<http://www.getempire.com/avaya-products/itemdetail.htm?id=901>>, Empire Technologies, 2007, p. 1.
"Avaya Unified Communications Solutions", Retrieved at <<http://www.avaya.com/master-usa/en-us/resource/assets/brochures/uc%20family%20brochure%20uc3377.pdf>>, 2008, pp. 1-4.
"VoIP, Conferencing and Messaging", Retrieved at <<http://guide.flossmetrics.org/index.php/VoIP,_conferencing_and_messaging>>, Mar. 18, 2009, pp. 6.
"eMerge Self-Help Guide", Retrieved at <<http://evolvebusinesssolutions.com/support/self-help-emerge-ga.aspx?content=ga_19_Music-Video-On-Hold-Add>>, Mar. 18, 2009, pp. 3.
"Troubleshooting Cisco Unified Video Advantage", Retrieved at <<http://www.cisco.com/en/US/docs/video/cuva/2_0/english/adminstration/guide/vtrble.html>>, Mar. 18, 2009, pp. 7.
"China First Office Action", Application No. 201080021958.9, Filed Date: Sep. 18, 2012, pp. 9.

* cited by examiner

Primary Examiner — Quynh Nguyen
(74) Attorney, Agent, or Firm — Turk IP Law, LLC

(57) ABSTRACT

Established multimodal conversations are enabled to be parked within an enhanced communication system such that a subscriber of the system can be notified through a variety of means and enabled to retrieve selected or all modalities for continuing the conversation. Different modalities may be parked together or separately. While waiting for the subscriber to retrieve the conversation, a participant may receive audio, video, presentation, or other forms of content as playback.

18 Claims, 8 Drawing Sheets

MULTIMODAL CONVERSATION PARK AND RETRIEVAL

BACKGROUND

Call parking and retrieval are an integral part of conventional communication technologies such as in PBXs. A parked call is typically a time-extended call transfer. Call parking is restricted to just audio calls and a single modality in the phone communication systems.

Modern communication systems have a large number of capabilities including integration of various communication modalities with different services. For example, instant messaging, voice/video communications, data/application sharing, white-boarding, and other forms of communication may be combined with presence and availability information of subscribers. Such systems may provide subscribers with the enhanced capabilities such as providing instructions to callers for various status categories, alternate contacts, calendar information, and comparable features.

With the advent of modern communication systems such as unified communications and the prevalent use of desktop and soft-phone based telephony, the above mentioned modalities and others are commonly utilized in two-party or multi-party communications. While these modalities provide an enriched experience to the users, they also provide different challenges and opportunities for handling communications at the system level.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling a subscriber of an enhanced communication system to park an established multimodal conversation within the enhanced communication system and notify another subscriber through a variety of means. The other subscriber may retrieve selected or all modalities for continuing the conversation. Different modalities may be parked together or separately on servers and/or endpoints. While waiting for the other subscriber to retrieve the conversation, a participant may receive audio, video, presentation, or other forms of content as playback.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
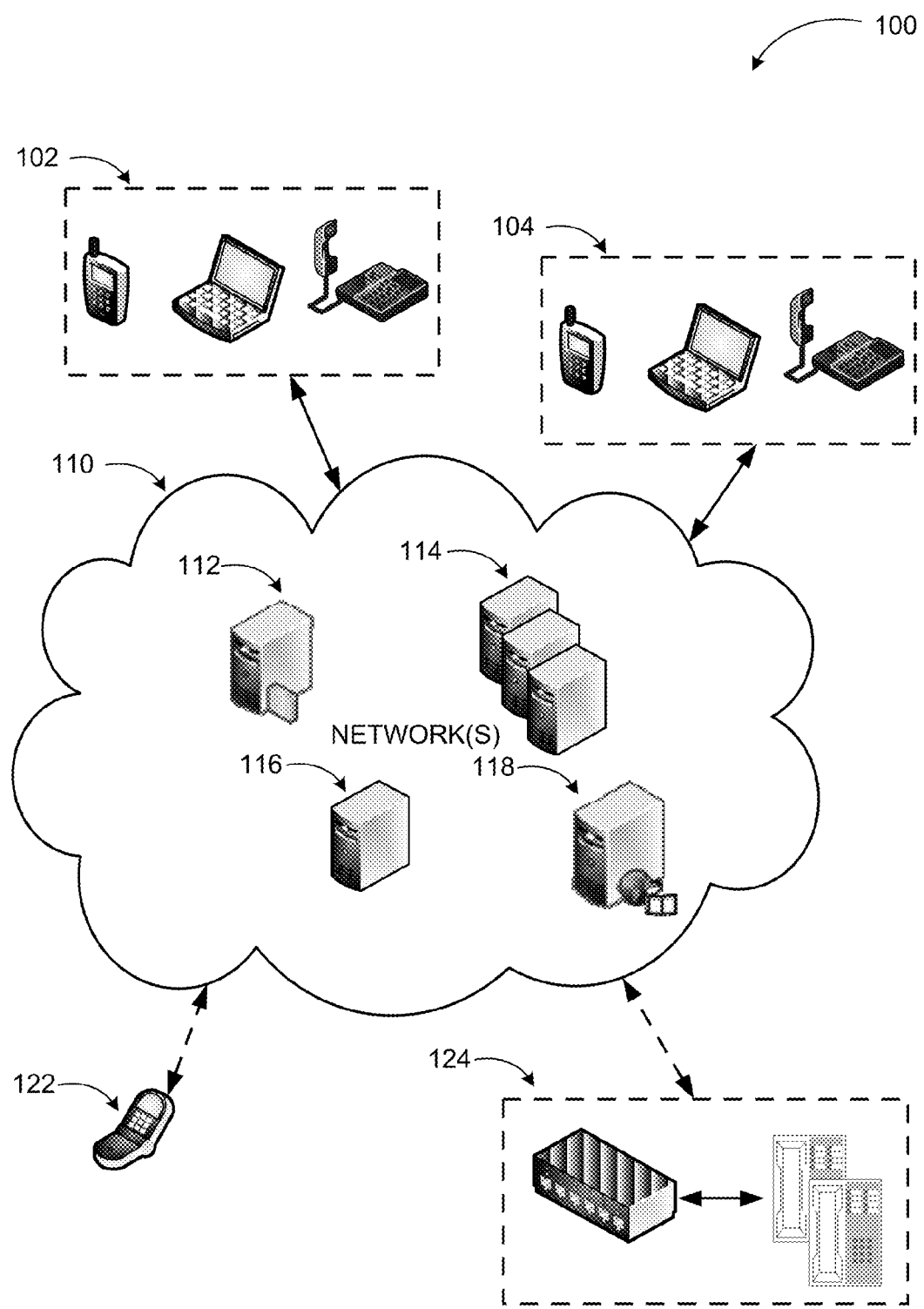
FIG. 1 is a diagram illustrating an example unified communications system, where embodiments may be implemented for multimodal conversation parking and retrieval.

As briefly described above, individual or all modalities of multimodal conversations may be parked and retrieved in an enhanced communication system while the parked participant is played back various content including, but not limited to, audio, video, presentations (e.g. slide presentation), file displays, and comparable ones. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality. Moreover, a subscriber of the UC system may use more than one end device and/or communication application for facilitating various modes of communication with other subscribers. End devices may also include various peripherals coupled to the end devices through wired or wireless means (e.g. USB connection, Bluetooth® connection, etc.) to facilitate different aspects of the communication.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method.

SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

A conversation as used herein refers to a multimodal communication session, where subscribers may communicate over a plurality of devices, applications, and communication modes simultaneously or sequentially. For example, two subscribers may initiate a conversation by exchanging instant messages through their desktop computers. Later, the communication may be elevated to audio and instant message with one subscriber utilizing their desktop for both modes, while the other uses the desktop computer for instant messaging and a smart phone device for the audio mode. Other subscribers may join or leave the conversation other modes and devices may be added or removed. The commonality between these communications is preserved by designating all these communications as belonging to the same conversation. Conversations may be assigned a unique identifier, which enables subscribers to view, record, modify, share, and generally manage aspects of the conversation including documents and other data associated with the conversation (e.g. documents exchanged as attachments in one mode of the conversation or recordings of other modes of the conversation).

While the example system in FIG. 1 has been described with specific components such as mediation server, A/V server, and similar devices, embodiments are not limited to this system of the example components and configurations. An enhanced communication system facilitating multimodal conversations with parking and retrieval capability may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein.

Figure 2:
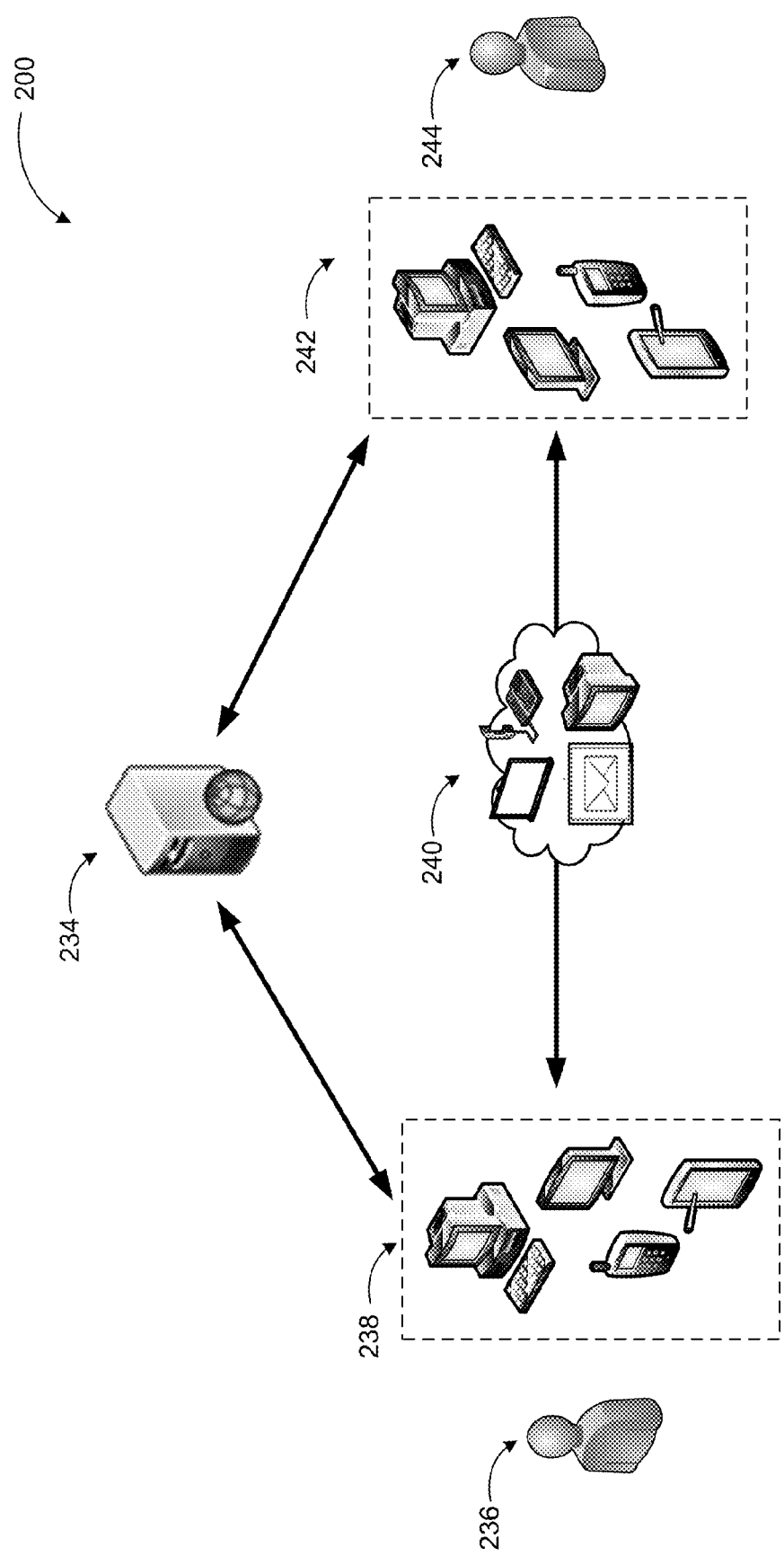
FIG. 2 is a conceptual diagram illustrating a basic example system for facilitating a multimodal conversation.

FIG. 2 is a conceptual diagram illustrating a basic example system for facilitating a multimodal conversation. While a system according to embodiments is likely to include a number of servers, client devices, and services such as those illustratively discussed in FIG. 1, only those relevant to embodiments are shown in FIG. 2.

In an enhanced communication system such as a unified communication system, subscribers (e.g. 236, 244) may facilitate multimodal communications 240 employing one or more end devices (e.g. 238, 242) and associated peripherals. Multimodal communication 240 may include audio, video, file sharing, desktop sharing, instant messaging, electronic mail, whiteboard sharing, and similar forms of communication. The conversation may be established and managed by one or more servers in a distributed fashion (e.g. server 234).

In this new world of unified communications, different modalities of the same conversation may be parked together as a single multimodal parked conversation and retrieved together or separately. For example, a customer may call in to a sales department of a company using audio only. The responding sales person may elevate the conversation to audio and desktop sharing. At some point during the conversation, the sale person may realize he/she needs to bring in (or transfer to) a technical expert. The sales person may park the conversation and notify a technical expert about the parked conversation. The technical expert may then retrieve the conversation using both modalities or just one and continue serving the customer.

There are several aspects of parking and retrieving multimodal conversations as illustrated in the above described example. The modalities (audio and instant messaging) may be parked together at a dedicated server (park server), at distinct dedicated servers (one park server for each modality), at multipurpose server(s) (e.g. a routing server), or even at individual endpoints of the system. The sales person may notify the technical expert through various means such as an electronic mail, an instant message, a SIP notification, a notification application of the communication system, or even voice based notification (a voice mail or audio call for example). The notification may include elements such as links to individual parked modalities such that the technical expert can select and retrieve individual modalities or a link to the entire conversation. Moreover, the notification may be directed to identified person(s) or to a group (e.g. a group instant message to the entire technical assistance group such that any available technical expert can retrieve the parked conversation).

While the conversation is parked, content in various modalities may be played back to the customer. For example, audio, video, or other forms of presentations may be provided (e.g. a slide presentation if the conversation includes video or application sharing modalities). While waiting for the technical expert, the customer may be educated on different products, on aspects of products, provided forms and other information on the offered services, and so on.

Participants in a multimodal conversation such as the one shown in diagram 200 may be part of the same network (e.g. an enterprise network), connected through different networks (e.g. in a federated environment), or communicate via a combination of secure and unsecure networks such as the Internet. Appropriate security measures such as personal identification numbers, passwords, and comparable ones may be employed to ensure privacy and security of the conversation.

Figure 3:
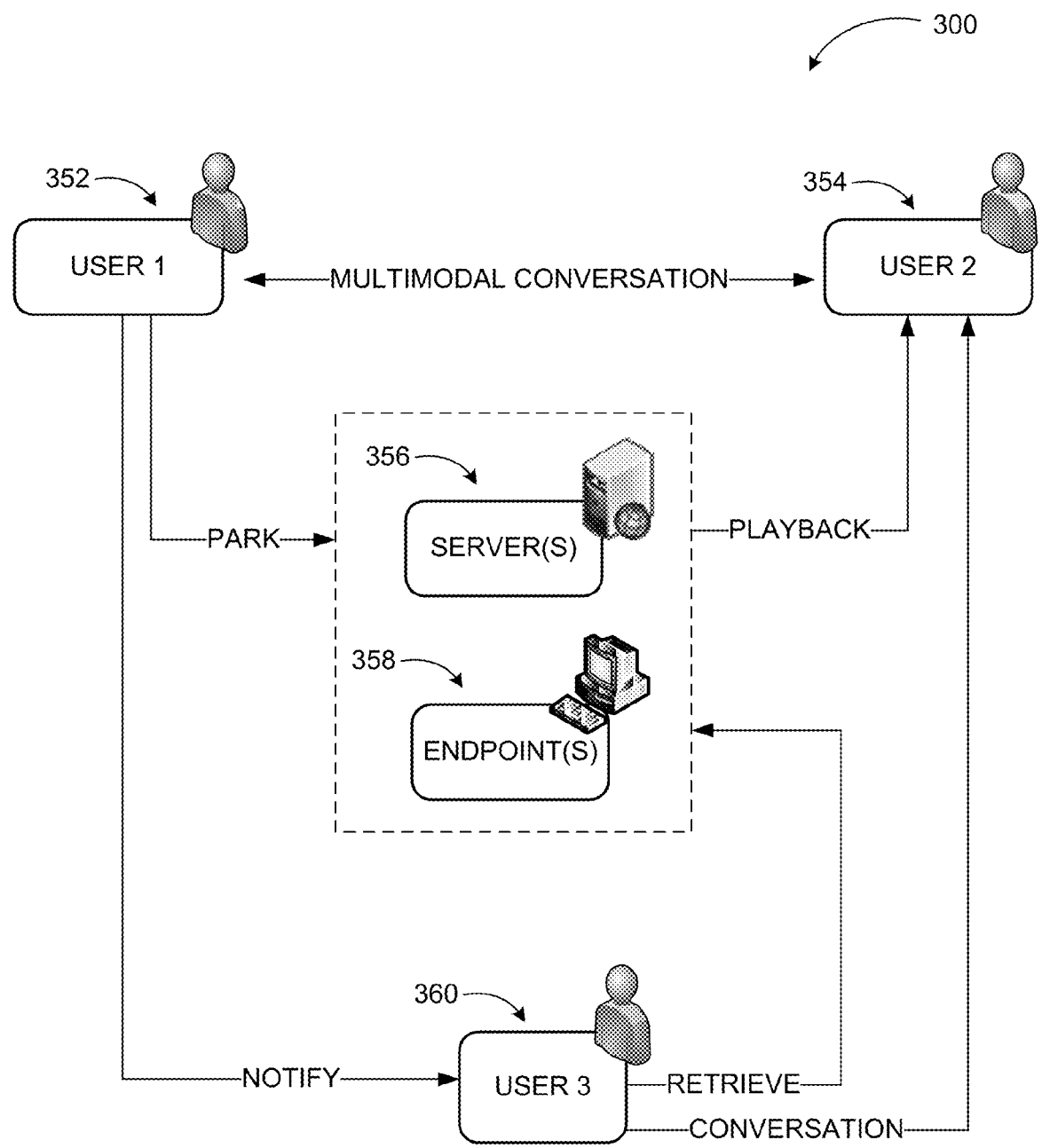
FIG. 3 illustrates major components and actions in an enhanced communication system for facilitating parking and retrieval of multimodal conversations according to embodiments.

FIG. 3 illustrates major components and actions in an enhanced communication system for facilitating parking and retrieval of multimodal conversations according to embodiments. Users 352 and 354 may establish a multimodal conversation as discussed above. The conversation may be facilitated through a number of servers and endpoints (356, 358). User 1 (352) may decide to park the conversation and transfer to (or bring in) user 3 (360). At that point, user 1 (352) may park the conversation through one or more of the servers 356 or endpoints 358. According to embodiments, all modalities of the conversation may be parked together or individually in a centralized or distributed fashion. Once the conversation is parked, user 1 (352) may notify user 3 (360) through electronic mail, instant message, a notification application, or other means. Once notified, user 3 (360) may retrieve all or some of the modalities of the parked conversation with user 2 (354) and continue. The notification, as discussed in more detail below) may enable user 3 to select which modalities to retrieve. Alternatively, the system may automatically determine which modalities to be retrieved based on capabilities of user 3, available resources, and similar factors.

Information about parked conversation(s) may be sent to or shared with email distribution lists or persistent chat sessions as well. The information may include links in form of SIP URI or URLs. While the conversation is parked, content may be played back to user 2 (354) in various modalities. A media server may be employed to provide such content. The content may include audio playback, video playback, presentation displays, data displays, and comparable ones.

An end recipient of such a parked conversation may not only be within an enterprise, but outside the enterprise such as in a federated environment, or even behind a SIP trunk. The end recipient may be able to authenticate himself/herself to retrieve the parked conversation using, for example, a shared corporate identifier that authenticates the user against a directory service.

Figure 4:
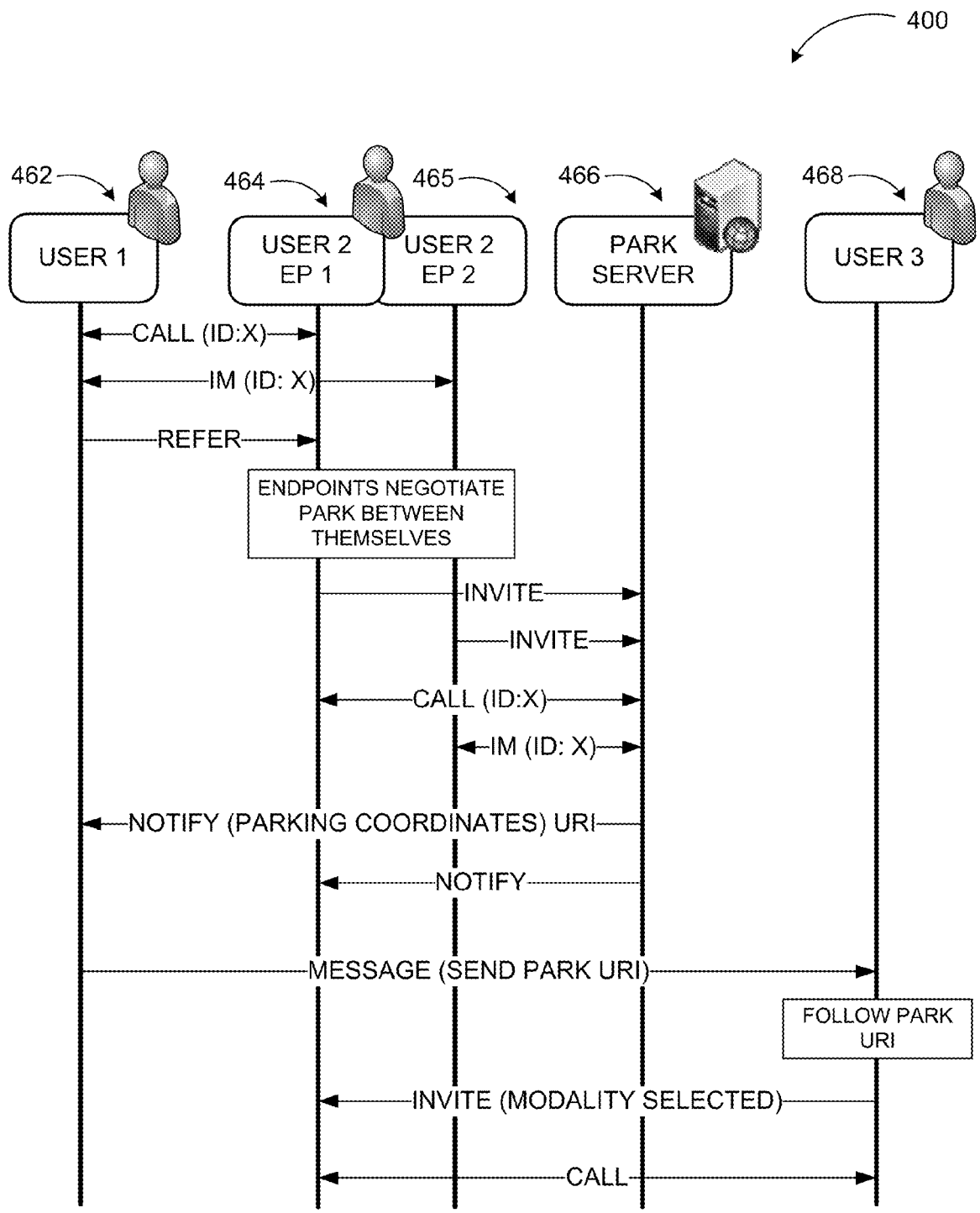
FIG. 4 is an action diagram illustrating example actions in parking and retrieving an example two-mode conversation in a unified communication system.

FIG. 4 is an action diagram illustrating actions in parking and retrieving an example two-mode conversation in a unified communication system. User 1 (462) establishes a two-mode conversation with user 2 employing an audio call with user 2's endpoint 1 (464) and an instant message session with user 2's endpoint 2 (465). Both modalities include conversation identifier X identifying them as part of the same conversation. Upon receiving a Refer request from user 1, the endpoints of user 2 (464, 465) negotiate parking the conversation between themselves and send separate invite messages to park server 466 for the two modalities of the conversation.

Following the invites from the endpoints of user 2, new sessions (audio and instant message) are established between the park server 466 and the endpoints of user 2 (464, 465) preserving the conversation identifier. In this mode, user 2 may be provided playback content as discussed previously. In the meantime, park server 466 provides location identifier for the parked conversation (e.g. as a SIP URI or Uniform Resource Locator 'URL') to user 1 and user 2. User 1 sends a notification message to user 3 (468) with the received SIP URI for the parked conversation.

User 3 (468) selects a modality (audio call in this example) by activating a link for the audio modality in the notification message. Subsequently, an invite is sent to the endpoint of user 2 (464) associated with the selected modality and the conversation continues in the selected modality between user 2 and user 3.

The above discussed scenarios, example systems, conversation modalities, and configurations are for illustration purposes. Embodiments are not restricted to those examples. Other forms of notifications, configurations, communication modes, and scenarios may be used in implementing multimodal conversations with parking and retrieval capability in a similar manner using the principles described herein.

Figure 5:
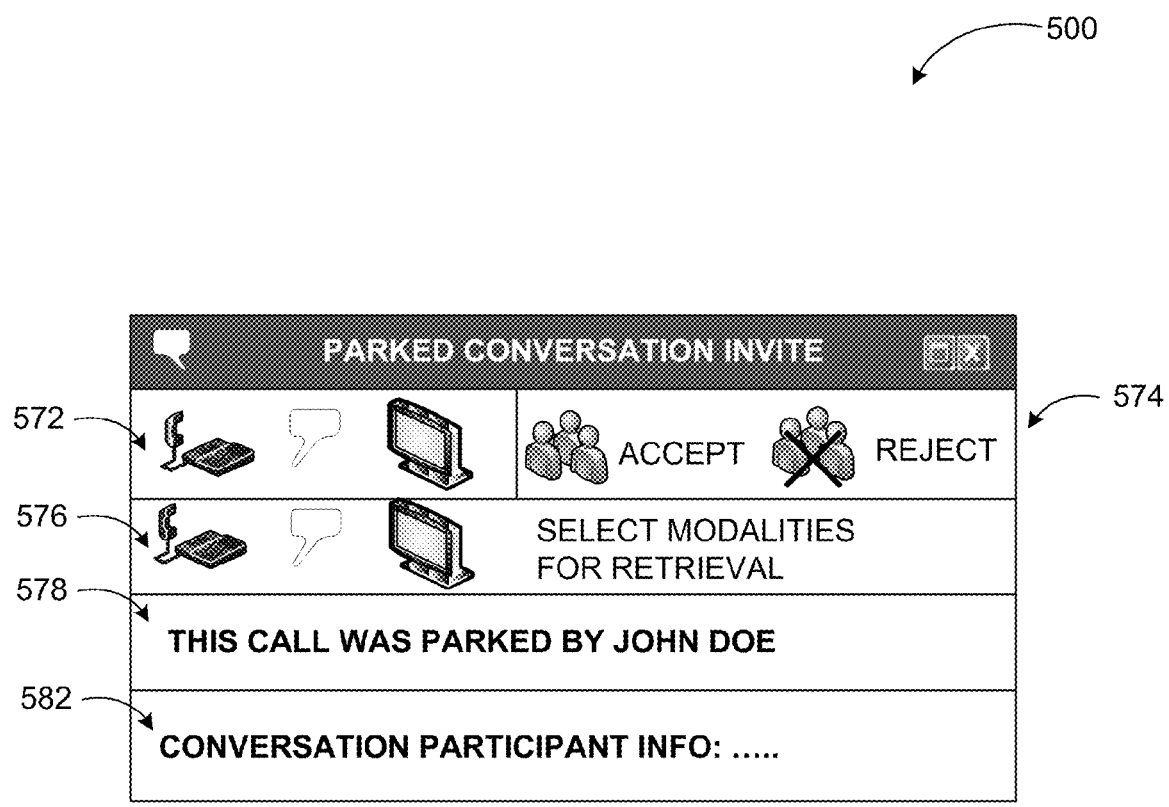
FIG. 5 is an example user interface for a parked conversation notification alert in a system according to embodiments.

FIG. 5 is an example user interface for a parked conversation notification alert in a system according to embodiments. Parking and retrieval notification in a system according to embodiments may be sent through a variety of means such as an electronic mail message with links to different modalities of the parked conversation, an instant message, a SIP notification, and comparable ones. Another approach may be a notification application that can provide a user interface like user interface 500.

User interface 500 is an example parked conversation invite. It includes graphic representations of current modalities in the parked conversation (572) and graphic/textual options to select acceptance of rejection by the invited user (574). The acceptance may also be accomplished by selecting one or more of the graphic representations of the available communication modes.

UI element 576 displays such selected communication modes for individual selection. Further information may be displayed by the user interface such as who parked the call (578) and conversation participant information 582 (name, address, any other pertinent information).

A user interface for notifying a subscriber about a parked call may include additional or fewer textual and graphical elements, and may employ various graphical, color, and other configuration schemes to display different functionalities. Other notification methods such as those described above may also be employed with additional or fewer elements as discussed herein.

Figure 6:
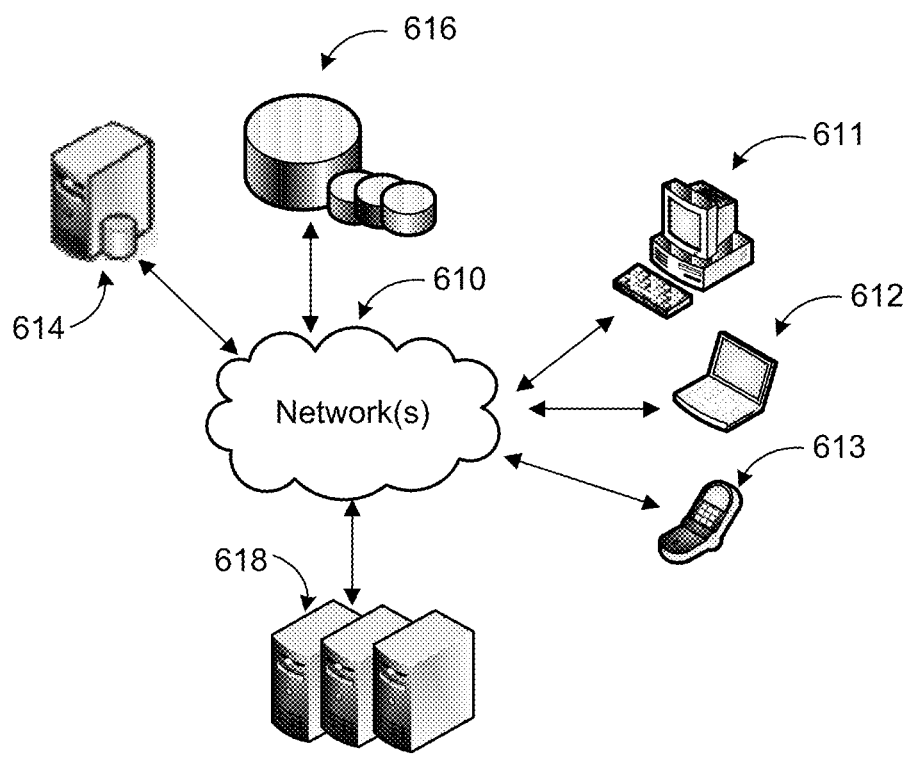
FIG. 6 is a networked environment, where a system according to embodiments may be implemented.

FIG. 6 is an example networked environment, where embodiments may be implemented. An enhanced communication system providing communication services including multimodal conversations with parking and retrieval capability may be implemented via software executed over one or more servers 618 such as a hosted service. The system may facilitate communications between client applications on individual computing devices such as a smart phone 613, a laptop computer 612, and desktop computer 611 ('client devices') through network(s) 610.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services and communication modes may be enabled.

Client devices 611-613 are used to facilitate communications through a variety of modes between subscribers of the communication system. One or more of the servers 618 may be used to park (and subsequently retrieve) all or some of the modalities of an established conversation. Information associated with subscribers and facilitating multimodal conversations, as well as multimodal content for playback, may be stored in one or more data stores (e.g. data store 616), which may be managed by any one of the servers 618 or by database server 614.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, data sources, and data distribution systems may be employed to implement a communication system with multimodal conversation parking and retrieval. Furthermore, the networked environments discussed in FIG. 6 are for illustration purposes only. Embodiments are not limited to the example applications, modules, or processes.

Figure 7:
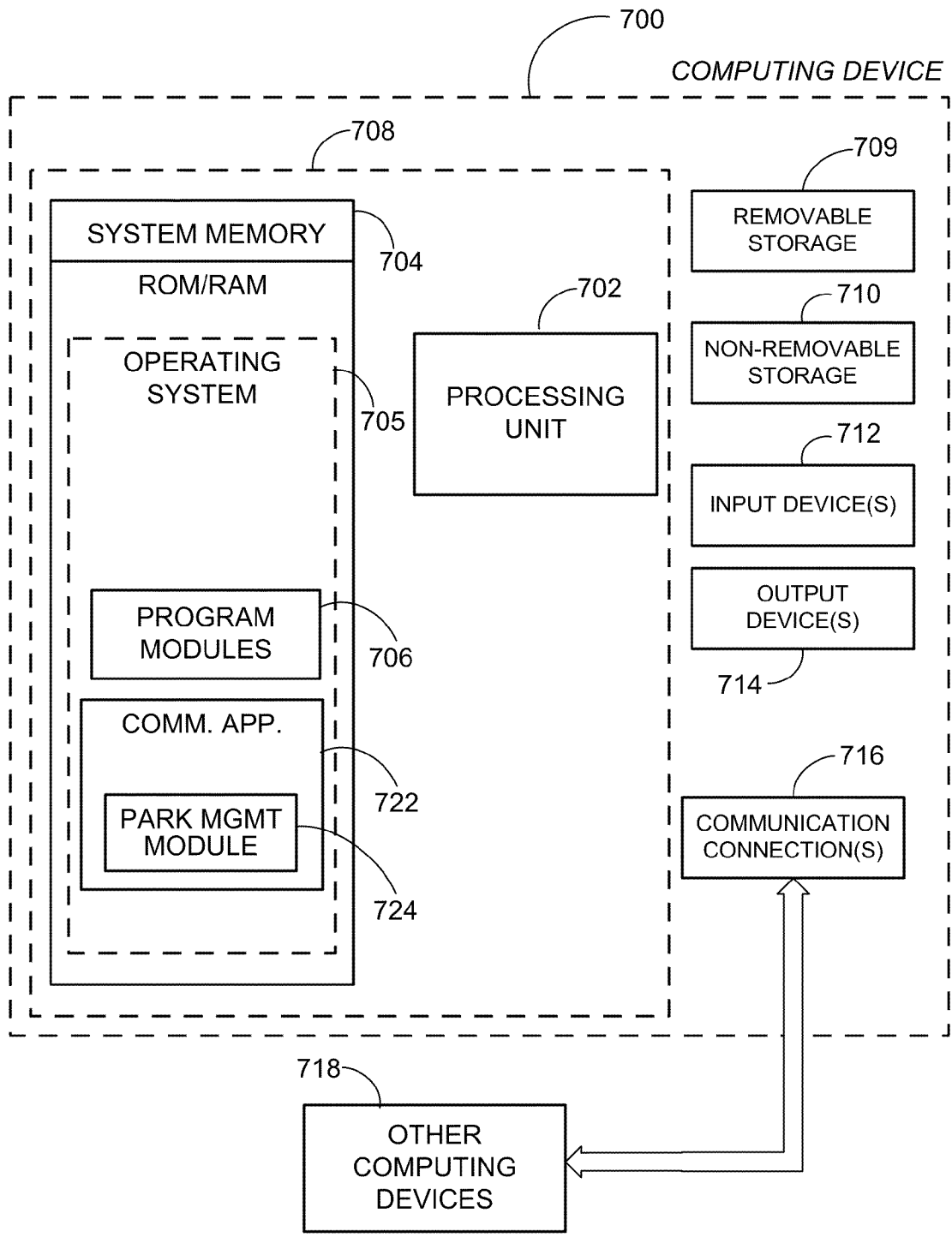
FIG. 7 is a block diagram of an example computing operating environment, where embodiments may be implemented.

FIG. 7 and the associated discussion are intended to provide a brief, general description of a suitable computing environment in which embodiments may be implemented. With reference to FIG. 7, a block diagram of an example computing operating environment for an application according to embodiments is illustrated, such as computing device 700. In a basic configuration, computing device 700 may be a conversation park server as part of an enhanced communication system and include at least one processing unit 702 and system memory 704. Computing device 700 may also include a plurality of processing units that cooperate in executing programs. Depending on the exact configuration and type of computing device, the system memory 704 may be volatile (such as RAM), non-volatile (such as ROM, flash memory, etc.) or some combination of the two. System memory 704 typically includes an operating system 705 suitable for controlling the operation of the platform, such as the WINDOWS® operating systems from MICROSOFT CORPORATION of Redmond, Wash. The system memory 704 may also include one or more software applications such as program modules 706, communication application 722, and park management module 724.

Communication application 722 may be part of a service that facilitates communication through various modalities between client applications, servers, and other devices. Park management module 724 may enable client applications to park some or all of the modalities of established conversations, notify other client applications about the parked conversation, and enable other subscribers to retrieve one or more modalities of the parked conversation. As discussed previously, park management module may coordinate the notification with other applications such as an electronic mail application, an instant message application, and similar ones. According to some embodiments, park management module 724 may also facilitate play back of content to participant(s) of the parked conversation in various modalities while the conversation is parked. This basic configuration is illustrated in FIG. 7 by those components within dashed line 708.

Computing device 700 may have additional features or functionality. For example, the computing device 700 may also include additional data storage devices (removable and/or non-removable) such as, for example, magnetic disks, optical disks, or tape. Such additional storage is illustrated in FIG. 7 by removable storage 709 and non-removable storage 710. Computer readable storage media may include volatile and nonvolatile, removable and non-removable media implemented in any method or technology for storage of information, such as computer readable instructions, data structures, program modules, or other data. System memory 704, removable storage 709 and non-removable storage 710 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer readable storage media may be part of computing device 700. Computing device 700 may also have input device(s) 712 such as keyboard, mouse, pen, voice input device, touch input device, and comparable input devices. Output device(s) 714 such as a display, speakers, printer, and other types of output devices may also be included. These devices are well known in the art and need not be discussed at length here.

Computing device 700 may also contain communication connections 716 that allow the device to communicate with other devices 718, such as over a wireless network in a distributed computing environment, a satellite link, a cellular link, and comparable mechanisms. Other devices 718 may include computer device(s) that execute communication applications, other directory or policy servers, and comparable devices. Communication connection(s) 716 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 8:
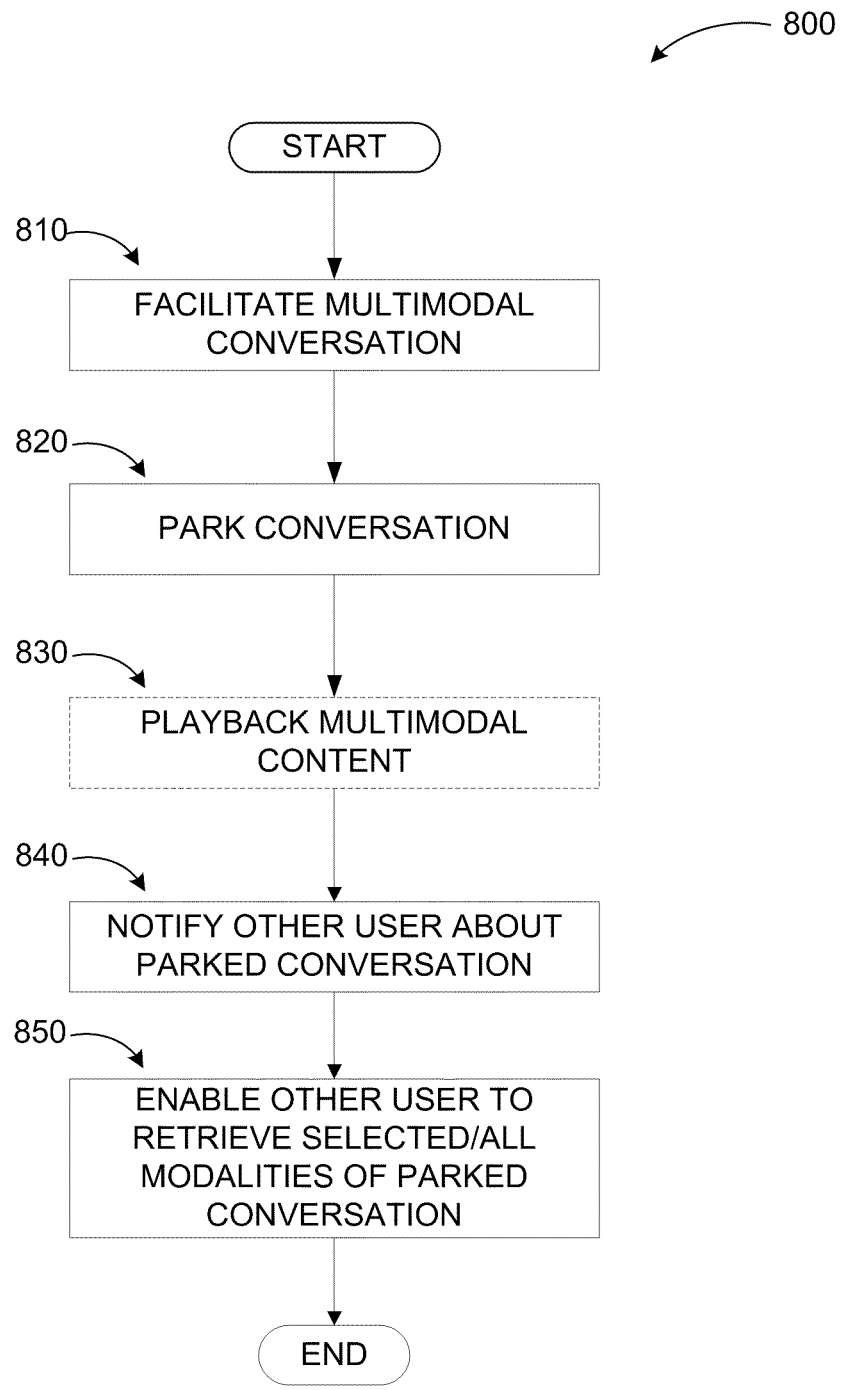
FIG. 8 illustrates a logic flow diagram for parking and retrieving multimodal conversations in an enhanced communication system according to embodiments.

FIG. 8 illustrates a logic flow diagram of process 800 for parking and retrieving multimodal conversations in an enhanced communication system according to embodiments. Process 800 may be implemented as part of a communication system that facilitates multiple communication modes.

Process 800 begins with operation 810, where a multimodal conversation is facilitated. As discussed previously, the multimodal conversation may include a number of modalities such as voice, video, electronic mail, instant messaging, application sharing, data sharing, whiteboard sharing, and so on. The conversation may include two or more participants and be initiated by any one of the participants.

At operation 820, one of the participants parks the conversation such that another party can be enabled to join the conversation. Different modalities of the conversation may be parked together or individually (or in groups) at dedicated servers, multi-purpose servers, or even endpoints of the enhanced communication system. The modalities may be identified as belonging together by the conversation identifier (which may be a numeric value, an alphanumeric value, or other symbol).

While the conversation is parked, different modalities of content may be played back to the parked participants at optional operation 830. Such content may include audio, video, presentations, or other forms of displayed data. According to other embodiments, one or more modalities of the conversation may continue, while remaining modalities are parked. For example, in a conversation containing audio, data sharing, and instant messaging, only the audio and data sharing modalities may be parked and the instant messaging modality continue to be facilitated while the parking participant notifies another subscriber of the system to join the conversation.

At operation 840, the parking participant notifies one or more subscribers of the enhanced communication system to join (or take over) the conversation. The notification may be in the form of an electronic mail, an instant message, a SIP notification, or other forms. The notification(s) may include links to the parked modalities of the conversation. The links may enable the other subscriber(s) to join (or take over) the conversation by activating all parked modalities or by activating only selected modalities of the conversation (e.g. based on the capabilities of the notified subscriber, a preference of the notified subscriber, etc.) at operation 850. Once the other subscriber joins the conversation by providing an indication of selected modalities, it may continue to be facilitated employing the selected modalities.

The operations included in process 800 are for illustration purposes. A communication service with multimodal conversation parking and retrieval capability may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating multimodal conversation park and retrieval, the method comprising:
   receiving a request for parking a multimodal conversation at a communication server;
   parking the conversation, wherein distinct modalities of the conversation are identified with a conversation identifier;
   notifying at least one subscriber about the parked conversation;
   enabling the at least one subscriber to retrieve at least one of the distinct modalities of the parked conversation;
   upon receiving an indication of selected modalities of the parked conversation from the at least one subscriber, enabling the subscriber to continue the conversation in the selected modalities; and
   providing a subscriber requesting to park the conversation with a parking location identifier of the conversation such that the notified at least one subscriber is enabled to retrieve the at least one of the distinct modalities of the parked conversation from a location identified by the location identifier.

2. The method of claim 1, further comprising:
   providing participants of the conversation multimodal content while the conversation is parked.

3. The method of claim 2, wherein providing the multimodal content includes at least one from a set of: playing back audio content, playing back video content, displaying a slide presentation, and displaying at least one file.

4. The method of claim 1, wherein the location identifier includes one of a Session Initiation Protocol (SIP) Uniform Resource Identifier (URI) and a Uniform Resource Locator (URL).

5. The method of claim 1, wherein a different location identifier is provided to the subscriber requesting to park the conversation for each modality of the conversation.

6. The method of claim 1, wherein the at least one subscriber is notified through one of: an electronic mail message, an instant message, a SIP notification, a notification application user interface, and a voice-based alert.

7. The method of claim 6, wherein notifying the at least one subscriber includes providing one of: a distinct link for each modality of the parked conversation and a single link for the entire parked conversation.

8. The method of claim 1, wherein the modalities of the conversation include one from a set of: audio communication, video communication, an application sharing session, a data sharing session, a whiteboard sharing session, an electronic mail exchange, and an instant message session.

9. The method of claim 1, wherein the conversation identifier has one of a numeric value and an alphanumeric value, and wherein distinct modalities of the conversation are parked together.

10. A communication system for implementing multimodal conversation park and retrieval, the system comprising:
    a communication server configured to facilitate multimodal communications between endpoints of the system;
    a park management server configured to:
        receive a request for parking an established multimodal conversation from an endpoint of the system;
        park the conversation in one of: a centralized manner at the park management server and a distributed manner at a plurality of servers, wherein distinct modalities of the conversation are associated together through a conversation identifier;
        provide a location identifier to the requesting endpoint such that another endpoint can be notified about the parked conversation; and
        enable the endpoint to retrieve at least one of the distinct modalities of the parked conversation;
    a participant of the conversation configured to:
        employ at least two endpoints to participate in the conversation and enable the endpoints to negotiate park operations among themselves.

11. The system of claim 10, further comprising a media server configured to store and to provide multimodal content to the participant of the conversation while the conversation is parked, wherein the content includes at least one from a set of and audio playback, a video playback, a slideshow presentation, and a document display.

12. The system of claim 10, wherein the plurality of servers includes one of: dedicated servers for each of the distinct modalities of the conversation, multipurpose servers, and a combination of servers and endpoints.

13. The system of claim 10, wherein the communication system is implemented as one of: a single network system in an enterprise environment and a multi-network system in a federated environment.

14. A tangible computer-readable memory device with instructions stored thereon for managing multimodal conversations with park and retrieval capability, the instructions comprising:
    facilitating a multimodal conversation among subscribers of a unified communication system, wherein each subscriber employs at least one endpoint to participate in the conversation;
    receiving a request for parking the multimodal conversation from a participating endpoint;
    parking the conversation, wherein distinct modalities of the conversation are associated together through a conversation identifier;
    providing a location identifier to the requesting endpoint such that another participating endpoint can be notified about the parked conversation;
    providing multimodal content to participating endpoints of the conversation while the conversation is parked;
    enabling a notified endpoint to retrieve at least one of the distinct modalities of the parked conversation; and
    providing an endpoint requesting to park the conversation with a parking location identifier of the conversation such that the notified other endpoint is enabled to retrieve the at least one of the distinct modalities of the parked conversation from a location identified by the location identifier.

15. The tangible computer-readable memory device medium of claim 14, further comprising enabling notification of a plurality of endpoints about the parked conversation through one of: a group email, and a persistent chat session.

16. The tangible computer-readable memory device of claim 15, wherein the group email and the persistent chat session include a plurality of links to enable a user associated with the other endpoint to select among available modalities of the parked conversation.

17. The tangible computer-readable memory device of claim 14, wherein the other participating endpoint is notified by a SIP message that includes the location identifier of the parked conversation and the conversation identifier.

18. The tangible computer-readable memory device of claim 14, wherein the other participating endpoint is enabled to retrieve select modalities of the parked conversation based on at least one of: a capability of the other participating endpoint and a preference of a user associated with the other participating endpoint.

* * * * *